US009080860B2

(12) United States Patent
Montanari et al.

(10) Patent No.: US 9,080,860 B2
(45) Date of Patent: Jul. 14, 2015

(54) METHOD FOR DETECTING THE SHAPE AND/OR DIMENSIONS OF A WHEEL ON VEHICLE REPAIR WORKSHOP MACHINES OR THE LIKE

(75) Inventors: Marco Montanari, Campegine (IT); Andrea Matteucci, Correggio (IT)

(73) Assignee: SICAM S.R.L., Correggio (IT)

( * ) Notice: Subject to any disclaimer, the term of this patent is extended or adjusted under 35 U.S.C. 154(b) by 0 days.

(21) Appl. No.: 13/813,374

(22) PCT Filed: Aug. 1, 2011

(86) PCT No.: PCT/IB2011/001770
§ 371 (c)(1),
(2), (4) Date: Jan. 30, 2013

(87) PCT Pub. No.: WO2012/014062
PCT Pub. Date: Feb. 2, 2012

(65) Prior Publication Data
US 2013/0128281 A1    May 23, 2013

(30) Foreign Application Priority Data
Jul. 30, 2010    (IT) .............................. MO2010A0222

(51) Int. Cl.
*G01B 11/24* (2006.01)
*G01M 1/02* (2006.01)
*G01M 1/04* (2006.01)
*G01B 11/25* (2006.01)

(52) U.S. Cl.
CPC ............ *G01B 11/24* (2013.01); *G01B 11/2522* (2013.01); *G01M 1/02* (2013.01); *G01M 1/045* (2013.01)

(58) Field of Classification Search
USPC ................. 356/601, 606, 155, 625, 139, 138, 356/3.01–3.15, 4.01, 139.02–139.09, 356/152.1–152.3, 153, 150; 33/203, 33/203.11, 288; 451/119, 155; 73/146, 66, 73/455–487; 353/13, 69, 70; 301/5.1–5.22
See application file for complete search history.

(56) References Cited

U.S. PATENT DOCUMENTS

| 5,054,918 A | 10/1991 | Downing et al. .............. 356/152 |
| 2006/0042380 A1 | 3/2006 | Douglas et al. ................. 73/460 |

FOREIGN PATENT DOCUMENTS

| EP | 0 565 320 | 10/1993 |
| EP | 2 020 594 | 2/2009 |
| WO | WO 2008/032343 | 3/2008 |

OTHER PUBLICATIONS

International Search Report for PCT/IB2011/001770; mailed Jan. 2, 2012.

*Primary Examiner* — Tri T Ton
(74) *Attorney, Agent, or Firm* — Stein IP LLC

(57) ABSTRACT

A method for detecting the shape or dimensions of a wheel on vehicle repair workshop machines comprises the stages of: projection of a line of light onto the surface of a portion of a wheel (3) mounted rotating on a vehicle repair workshop machine; acquisition of at least a two-dimensional image of the projected line of light; processing the acquired image to determine the profile of the portion of the wheel; at least two stages of complete rotation of the wheel; and a distributed detection stage, wherein the projection stage and acquisition stage are performed in correspondence to first angular positions of the wheel during the first rotation stage, and in correspondence to second angular positions of the wheel during the second rotation stages, the first angular positions and the second angular positions being at least partially distinct the one from the other.

19 Claims, 4 Drawing Sheets

Fig. 5

| | i=1,...,20 | | | | | | | | | | | | | | | | | | | | PROGR. |
|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | |
| $D_1$ | x | | x | | x | x | x | x | x | x | x | x | x | x | x | x | x | | x | | 50% |
| $D_2$ | | x | | x | x | x | x | x | x | x | x | x | x | x | x | x | x | x | x | x | 100% |

Fig. 6

| | I  i=1,...,5 | | | | | PROGR. | II  i=6,...,10 | | | | | PROGR. | III  i=11,...,15 | | | | | PROGR. | IV  i=16,...,20 | | | | | PROGR. |
|---|---|---|---|---|---|---|---|---|---|---|---|---|---|---|---|---|---|---|---|---|---|---|---|---|
| | 1 | 2 | 3 | 4 | 5 | | 6 | 7 | 8 | 9 | 10 | | 11 | 12 | 13 | 14 | 15 | | 16 | 17 | 18 | 19 | 20 | |
| $D_1$ | x | | | x | | 40% | | | | | | 20% | | | | | | 20% | x | | | | | 40% |
| $D_2$ | x | x | x | x | x | 60% | x | | | | | 20% | x | x | | | | 20% | x | | | x | x | 40% |
| $D_3$ | x | x | x | x | x | 100% | x | x | | | | 40% | x | | | | | 20% | x | | | | | 40% |
| $D_4$ | x | | x | x | x | 100% | x | x | x | | | 60% | x | | | | | 20% | x | | | | | 40% |
| $D_5$ | x | x | | x | x | 100% | x | | | | | 60% | x | x | x | x | | 80% | x | x | | x | x | 60% |
| $D_6$ | x | x | | x | x | 100% | x | | | x | x | 80% | x | x | x | x | x | 80% | x | x | x | x | x | 60% |
| $D_7$ | x | x | | x | x | 100% | | x | | x | x | 80% | x | x | x | x | x | 80% | x | x | x | x | x | 80% |

METHOD FOR DETECTING THE SHAPE AND/OR DIMENSIONS OF A WHEEL ON VEHICLE REPAIR WORKSHOP MACHINES OR THE LIKE

CROSS-REFERENCE TO RELATED APPLICATIONS

This application is the national stage of PCT/IB2011/001770, filed Aug. 1, 2011, which claims the benefit of Italian Application No. MO2010A000222, filed Jul. 30, 2010 in the Italian Patent and Trademark Office. The disclosures of both documents are incorporated herein by reference.

TECHNICAL FIELD

The present invention relates to a method for detecting the shape and/or dimensions of a wheel on vehicle repair workshop machines or the like.

BACKGROUND ART

It is known that the wheels of a vehicle are, generally, made up of a cylindrical metal rim having, at the axial extremities, annular raised edges between which is defined a channel for slotting in an elastic tyre, the side portions of which, so-called "beads", are fitted fast up and against the annular raised edges themselves.

The need is also known to perform frequent balancing operations which consist in the fitting of weights, made of lead or other material, in correspondence to predetermined points of the wheel and along the rim and the need to check the aptitude of the wheel to correctly spin following a geometric analysis of the rim and of the tyre.

In fact, during wheel rotation, the fitting of the weights offsets any irregularities of the tyre and/or the rim which would lead to the production of vibrations or stresses during vehicle movement.

To perform such operations, balancing machines are commonly used comprising a supporting structure for the wheel gripping and rotation means, of the type of a spindle axially rotatable by means of motor means, onto which the wheel rim is keyed by means of suitable engagement and centring parts.

The measurement of wheel unbalance is determined during rotation by suitable electronic or electro-mechanical devices, such as force transducers fitted along the spindle.

To the measurement of unbalance are generally added other characteristic measurements, such as the measurement of the roundness of the wheel, of the eccentricity of the wheel, the amount of wear of the tread, the conformation of the rim or other wheel irregularities, normally performed by means of suitable measurement sensors with or without contact (e.g., feelers or optical sensors).

Once the necessary measurements have been taken, the machine is able to calculate the size and position of the balancing weights to be fitted to the wheel rim to offset the wheel irregularities.

The fitting of the balancing weights is normally done manually by an operator in one of more precise points of the wheel rim indicated by the machine.

The no-contact measurement of the dimensional characteristics of the wheel is commonly done by means of systems which use the triangulation method and which, generally speaking, have a moving mechanical support that moves a punctiform laser beam emitter and a sensor device, of the type, e.g., of a linear CCD (Charged-Coupled Device), suitable for determining the laser light reflected by the wheel.

In particular, by positioning the system close to the wheel rotation axis and moving the mobile support to perform a series of successive measurements, the inner dimensions of the rim and the position of the balancing planes for calculating the balancing weights to be fitted can be determined.

Such known systems allow obtaining, in a relatively economic way, the same information obtained by means of a traditional contact sensor, of the type, e.g., of a mechanical feeler or the like.

These known systems, however, are not without drawbacks.

In particular, the movement of the mechanical support, needed to perform a series of successive measurements, requires considerable time and slows down the entire process of acquisition of the dimensional characteristics of the wheel.

The document U.S. Pat. No. 5,054,918 describes an appliance that can be used to detect the shape and the dimensions of a wheel fitted to a balancing machine.

Such appliance has a laser blade emitter suitable for projecting a laser line on the portion of wheel to be measured.

This way, the laser blade plane produced intercepts the wheel profile, projecting a broken or curved laser line onto the surface of the wheel itself.

The appliance also has a light-sensitive sensor device, of the type of a camera or the like, arranged in a predefined position with respect to the laser emitter and suitable for determining the laser line projected on the wheel.

Appliance processing means are suitable for determining the structural and dimensional characteristics of the wheel, starting from the shape of the projected laser line.

A similar appliance is also illustrated in the patent document US 2006/0042380. These appliances nevertheless are also susceptible to upgrading, aimed in particular at allowing a more precise determination of the structural and dimensional characteristics of the wheel and/or a faster determination process.

In this respect, the fact is underlined that to carry out a correct measurement of the unbalance of a wheel, this must be made to rotate at a rather high speed.

The cameras fitted on traditional balancing machines however have the capacity to detect images with a very limited sampling frequency and are practically unusable when the wheel is made to rotate at high speed.

The traditional balancing machines equipped with a viewing system, therefore, usually contemplate an initial stage of rotation of the wheel at low speed, for the acquisition of the images, and a subsequent stage of rotation of the wheel at high speed, for the detection of the unbalance.

This results is an inconvenient extension of the times of execution and it is for this reason that the balancing machines with viewing systems are also very slow.

DESCRIPTION OF THE INVENTION

The main aim of the present invention is to provide a method for detecting the shape and/or the dimensions of a wheel on vehicle repair workshop machines or the like that allows acquiring the structural and dimensional characteristics of the wheel with greater approximation with respect to the background art.

Another object of the invention is to provide a method for detecting the shape and/or the dimensions of a wheel on vehicle repair workshop machines or the like that allows acquiring the structural and dimensional characteristics of the wheel in a faster way than with the background art.

Another object of the present invention is to provide a method for detecting the shape and/or the dimensions of a wheel on vehicle repair workshop machines or the like that allows overcoming the mentioned drawbacks of the state of the art in the ambit of a simple, rational, easy and effective to use as well as low cost solution.

The above objects are achieved by the present method for detecting the shape and/or dimensions of a wheel on vehicle repair workshop machines or the like, comprising the stages of:
- projection of at least a line of light onto the surface of at least a portion of a wheel mounted rotating on a vehicle repair workshop machine or the like;
- acquisition of at least a two-dimensional image of said projected line of light;
- processing of said acquired image to determine the profile of said portion of the wheel;

characterized by the fact that it comprises at least two stages of complete rotation of said wheel and a distributed detection stage, wherein said projection stage and acquisition stage are performed in correspondence to first angular positions of said wheel during the first of said rotation stages, and in correspondence to second angular positions of said wheel during the second of said rotation stages, said first angular positions and said second angular positions being at least partially distinct the one from the other.

BRIEF DESCRIPTION OF THE DRAWINGS

Other characteristics and advantages of the present invention will become more evident from the description of a preferred, but not sole, embodiment of a method for detecting the shape and/or dimensions of a wheel on vehicle repair workshop machines or the like, illustrated purely as an example but not limited to the annexed drawings in which:

FIG. 5 is a table that shows a possible operation of the method according to the invention;

FIG. 6 is a table that shows a possible alternative to the operation of FIG. 5.

EMBODIMENTS OF THE INVENTIONS

Figure 1:
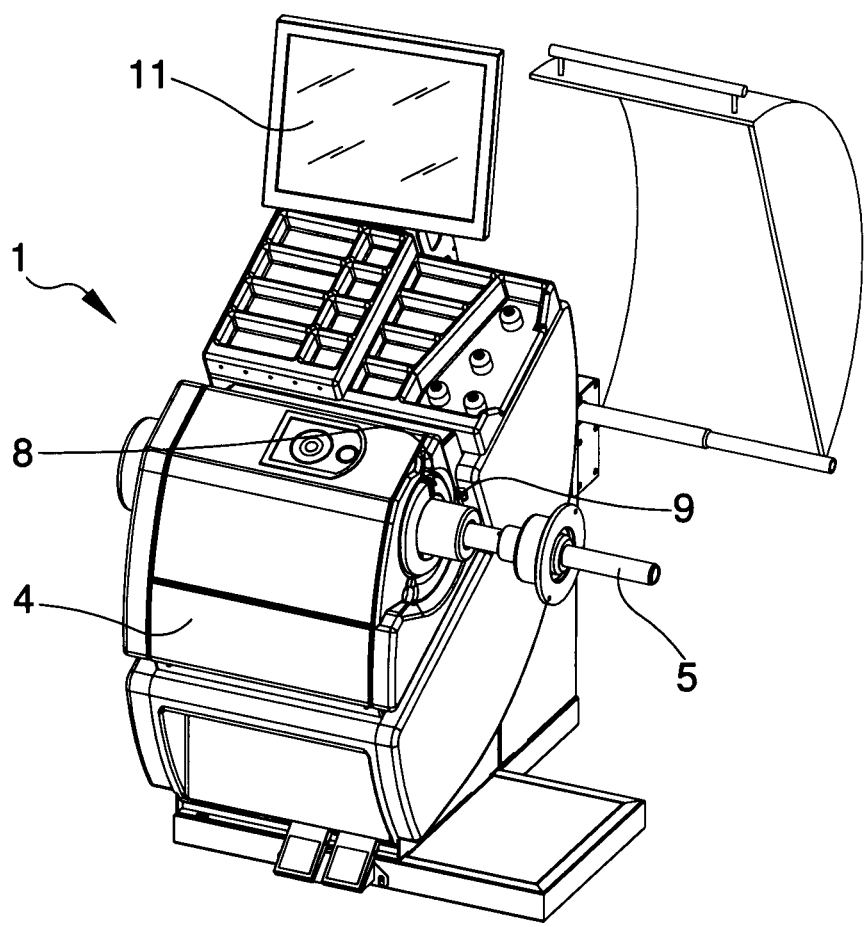
FIG. 1 is an axonometric view of a balancing machine for detecting the shape and/or dimensions of a wheel by means of the method according to the invention.
Figure 2:
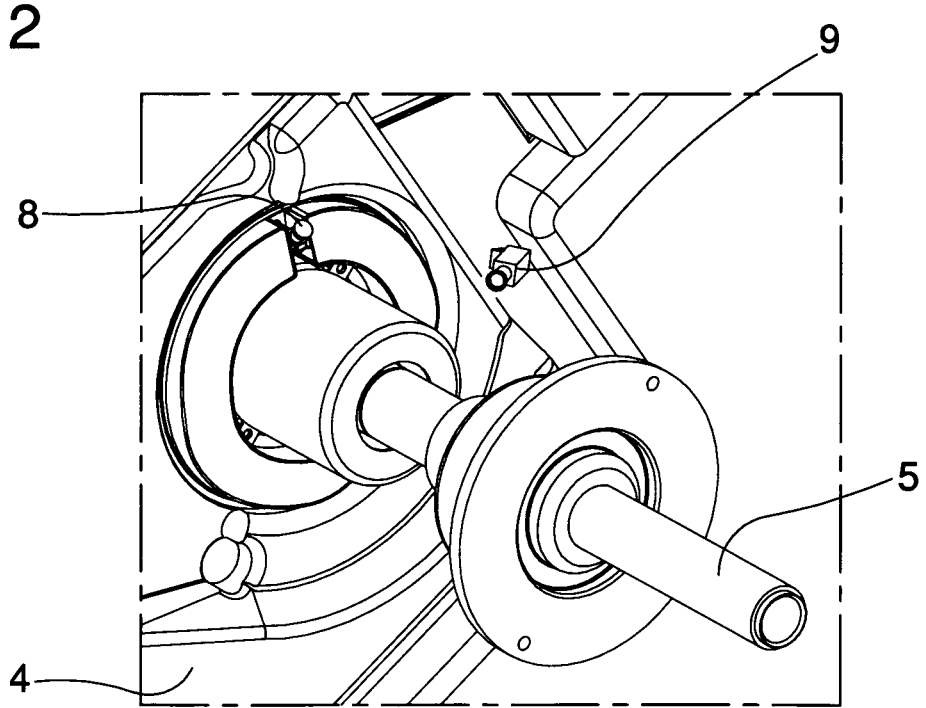
FIGS. 2 and 3 are axonometric views of parts of the balancing machine of FIG. 1.
Figure 3:
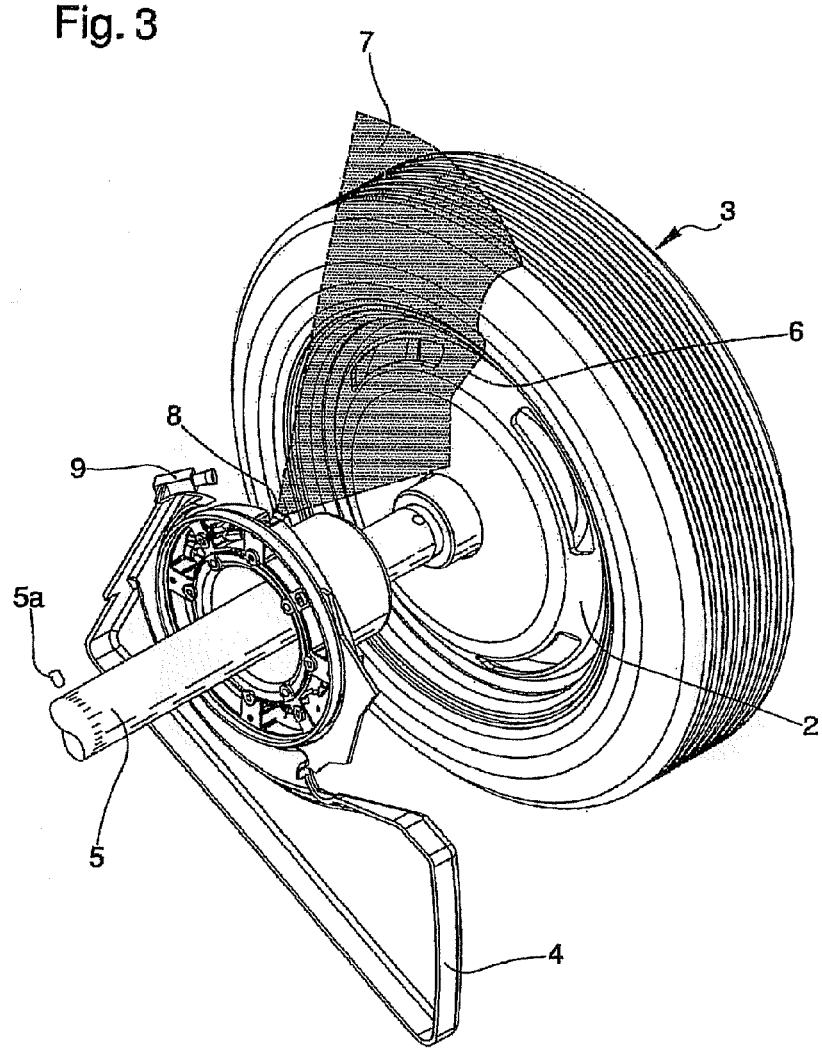
Figure 4:
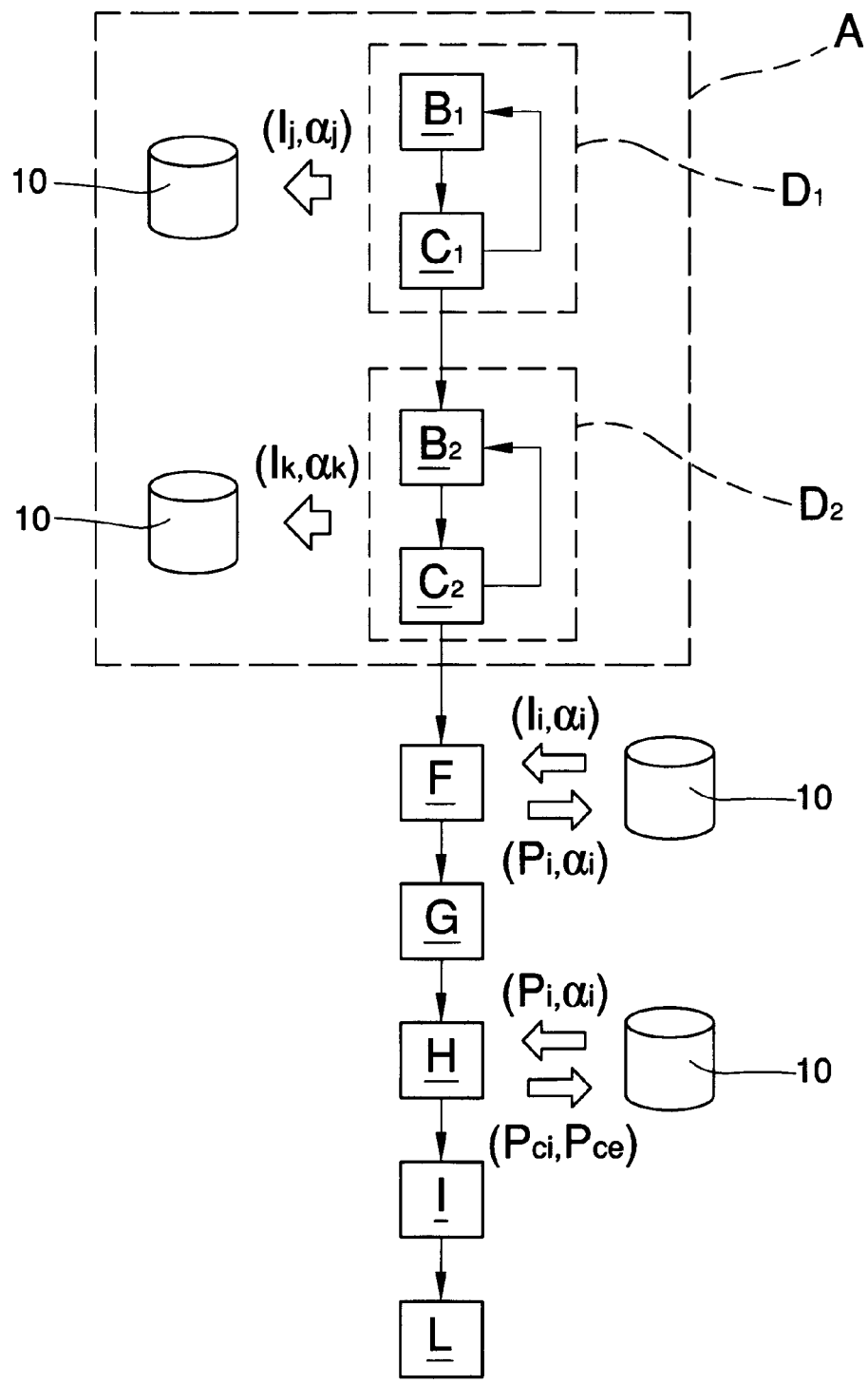
FIG. 4 is a general block diagram that illustrates the method according to the invention.

With particular reference to FIG. 4, globally indicated by M is a method for detecting the shape and/or dimensions of a wheel on vehicle repair workshop machines or the like.

In particular, the method M according to the invention is used on a balancing machine 1 to detect the inner dimensions of the rim 2 of a wheel 3 and, consequently, the position of the balancing planes Pci, Pce for calculating the balancing weights to be fitted.

In particular, the balancing machine 1 comprises a supporting structure 4 and gripping and rotating means for gripping and rotating a wheel 3, indicated altogether by the reference 5 and composed, e.g., of a horizontal spindle axially rotatable by the operation of motor means and on which the rim of the wheel 3 is keyed.

The spindle 5 is connected, e.g., to an angular encoder 5a suitable for detecting the angular position of the spindle 5 with respect to a fixed position inside the reference system of the balancing machine 1.

The possibility cannot however be ruled out of using the method M according to the invention on different types of machines with respect to the illustrated balancing machine 1, as in the case of machines used to measure the level of the inlay or the wear characteristics of the tyre of a wheel, or the analysis of the shoulder of the tyre, or the detection of the coupling point between the rim and the tyre of a wheel in a tyre-changing machine.

The method M comprises a distributed detection stage (stage A), during which the following are performed:
- the projection of a line of light 6 onto a section of the inner surface of the rim 2 (stages $B_1$ and $B_2$);
- the acquisition of a two-dimensional image of the line of light 6 projected onto the rim 2 (stages $C_1$ and $C_2$).

Advantageously, the distributed detection stage A comprises two or more complete rotation stages of the wheel 3, mounted rotating on the balancing machine 1.

In the embodiment shown in the FIG. 4, e.g., the rotation stages are two and are indicated by the reference letters $D_1$ and $D_2$, but it is easy to understand how these can be of greater number.

In particular, the projection stage $B_1$ of the line of light 6 and the acquisition stage $C_1$ are performed in correspondence to the first angular positions $\alpha_j$ of the wheel 3 during the first rotation stage $D_1$, for the acquisition of a plurality of images $I_j$ relating to different profiles of the rim 2.

Instead, the projection stage $B_2$ of the line of light 6 and the acquisition stage $C_2$ are performed in correspondence to second angular positions $\alpha_k$ of the wheel 3 during the second rotation stage $D_2$, for the acquisition of a plurality of images $I_k$ relating to different profiles of the rim 2.

Clearly, in the event of a larger number of rotations $D_1, \ldots, D_y$ being contemplated, it is easy to appreciate how the projection stages $B_1, \ldots, B_y$ and the acquisition stages $C_1, \ldots, C_y$ are repeated for each rotation in correspondence to different groups of angular positions $\alpha_j, \alpha_k, \alpha_w, \ldots, \alpha_z$.

Usefully, the first angular positions $\alpha_j$ and the second angular positions $\alpha_k$ are at least in part distinct the one from the other.

This means, in other words, that the group of angular positions $\alpha_j$ differ from the group of angular positions $\alpha_k$ inasmuch as at least one of the angular positions $\alpha_j$ is not present in the group of angular positions $\alpha_k$, or vice versa.

By way of example, the group of angular positions $\alpha_j$ can be considered as the group of angular positions corresponding to the odd notches of the angular encoder 5a, while the group of angular positions $\alpha_k$ can be considered as the group of angular positions corresponding to the even notches of the angular encoder 5a.

In this case, the angular positions $\alpha_j$ and $\alpha_k$ are perfectly distinct the one from the other and, indicating by n the total number of angular positions, are pre-established by means of the following indices:
$i=1, \ldots, n$
$x=1, \ldots, n/2$
$j=2x-1$
$k=2x$ In this respect, it is underlined that, more in general, the index n indicates the total number of the angular positions in which the acquisitions of the images $I_j$, $I_k$ are made and can have a pre-defined fixed value or a variable value selected by an operator according to the required level of approximation; that this coincide with the total number of notches on the angular encoder 5a is not in fact mandatory, inasmuch as the operator may only be interested in a certain sector of the wheel 3.

Supposing n=20, then such exemplary configuration is schematically shown on the table in FIG. 5.

In correspondence to the first rotation stage $D_1$ the images are consequently acquired corresponding to 50% of the angular positions at disposal, while in the second rotation stage $D_2$ the images are acquired corresponding to the remaining angular positions, obtaining 100% of the detected angular positions.

The acquired images $I_j$ and $I_k$ and the corresponding angular positions $\alpha_j$ and $\alpha_k$ are stored by means of storage means 10 of the balancing machine 1.

At the end of the distributed detection stage A, therefore, the storage means 10 are able to make use of a number of images $I_i$ paired with the corresponding angular positions $\alpha_i$.

It is easy to appreciate how a similar result can be obtained by means of a greater number of rotations $D_1, \ldots, D_y$, e.g., four or five, to each rotation being given a lower number of acquisitions, e.g., n/4 or n/5.

At the same time, the possibility cannot be ruled out that the first angular positions $\alpha_j$ and the second angular positions $\alpha_k$ not be set or pre-defined by the operator but be selected by the balancing machine 1 on a random basis.

In this case, at each rotation $D_1$, $D_2$ a series of angular positions is selected distributed in random fashion on the n positions at disposal.

To allow, in any case, the concentration of detections to be sufficiently distributed over the entire wheel, the distributed detection stage A contemplates the wheel being split up into at least two sectors (e.g., four sectors I, II, III, IV of 90° each) and continues until in each sector images have been acquired for a pre-established number of angular positions (e.g., 80% of the angular positions of each sector).

Supposing n=20, then such exemplary configuration is schematically shown on the table in FIG. 6.

This table shows, in an exemplary way, seven subsequent rotation stages $D_1, \ldots, D_7$ in which images are acquired in correspondence to the angular positions chosen at random.

The first sector I reaches the pre-established dimension of at least 80% of the angular positions detected already after the third rotation $D_3$.

The second sector II reaches the pre-established dimension after the sixth rotation $D_6$.

The third sector III reaches the pre-established dimension after the fifth rotation $D_5$.

The fourth sector IV reaches the pre-established dimension after the seventh rotation $D_7$, after which the distributed detection stage A stops.

In point of fact, the method according to the invention does not call for the distributed detection stage A to stop only once the detection has been made in correspondence to all the angular positions at disposal.

This represents a major advantage because, in some angular positions, the conformation and/or the reflectance of the wheel 3 may be such as not to allow the acquisition of moving images in any way.

By means of the random selection of the angular positions, the machine 1 is not forced to pointlessly try and acquire images in pre-established angular positions impossible to detect and is able to continue its operation without hindrance and terminate the distributed detection stage A even if images have not been provided from all the angular positions.

In the event, nevertheless, of the operator being interested in detecting a specific non-detected angular position at the end of the distributed detection stage A, a manual detection stage can be usefully contemplated which consists in manually positioning the wheel 3 in correspondence to the angular position of interest and acquiring the image with the wheel 3 stopped.

Preferably, the projection stages $B_1$, $B_2$ comprise the generation of a blade of light 7.

The lying plane of the blade of light 7 is directed so as to intercept the rim 2 along its profile, so as to project onto the surface of the rim 2 a line of light 6 which is broken or curved according to the conformation of the profile itself.

The blade of light 7 is generated by means of a light emitter 8, preferably made up of a laser device of the type of a diode laser or the like.

Alternatively, the projection stages $B_1$, $B_2$ can comprise the generation of a straight light beam and the rapid oscillation of such light beam between two extreme positions so as to project onto the surface of the rim 2 a line of light 6 which is broken or curved according to the conformation of the profile itself.

The straight light beam can be generated by means of a laser device of the type of a diode laser or the like.

The oscillation of the light beam can be obtained, e.g., by means of the following solutions:
  use of a mobile or rotatable laser device and rapid movement of same between two extreme positions;
  use of a fixed laser device coupled to a mobile reflecting element of the type of a mirror or the like, suitable for reflecting and directing the beam generated by the laser device towards the rim 2, and rapid movement of the reflecting element between two extreme positions.

Preferably, the image acquisition stages $C_1$, $C_2$ are performed by means of a light sensor 9 composed of a camera with matrix sensor, of the type e.g. of a CCD (Charged-Coupled Device) or CMOS (Complementary Metal-Oxide Semiconductor) sensor.

The camera 9 is fastened to the balancing machine 1 and is arranged in correspondence to a predefined position with respect to the laser device 8.

The method M also comprises the processing of the images $I_i$ acquired during the distributed detection stage A, to determine corresponding profiles $P_i$ of the rim 2 (stage F).

In particular, during the processing stage F, the points in space making up each of the profiles $P_i$ are determined by means of an optical triangulation procedure, starting with the acquired images $I_i$ and starting with the predefined relative position between the laser device 8 and the camera 9.

The method M also comprises the storage of the determined profiles $P_i$ and of the corresponding angular positions $\alpha_i$ by means of the storage means 10 of the balancing machine 1.

The method M also comprises a stage of measurement of the unbalance of the wheel 3, performed by means of the balancing machine 1 starting the wheel 3 turning at high speed (stage G).

In the graphic representation of the present method illustrated in FIG. 4, the stage G for measuring the unbalance is arranged downstream of the distributed detection stage A and of the processing stage F.

It must be underlined however that the stage A can be performed at the same time as the unbalance measuring stage G.

Besides, the method M also comprises a calculation stage, starting with the determined profiles $P_i$, of the characteristic dimensions and of the balancing planes Pci, Pce of the wheel 3 (stage H).

The calculated balancing planes Pci, Pce can be displayed by means of a display 11 of the balancing machine 1 and the operator can select the balancing planes Pci, Pce to be used from among all those calculated.

Usefully, the display 11 can be connected to the camera 9 and the inner profile of the rim 2 can be displayed together with the balancing planes Pci, Pce calculated to facilitate selection by the operator.

Alternatively, by means of the display 11, a virtual model of the rim 2 can be graphically represented, processed starting with the determined profiles $P_i$.

Usefully, the method M can comprise a supplementary stage for calculating the measurement of the eccentricity of the wheel 3, made starting with the determined profiles $P_i$.

Subsequently, the method M comprises a wheel balancing stage (stage I), wherein the balancing machine 1 indicates the type of balancing weights and the fitting position of such weights on the display 11. The operator then turns the wheel 3 to the correct angular positions and fits the weights.

During such operation, the operator can be helped by a graphic representation on the display 11 of the exact position in which the balancing weights have to be fitted.

Alternatively or as a further aid for the operator, the fitting position of the balancing weights can be indicated directly on the wheel 3 by means of a laser sighting tool.

Usefully, such laser sighting tool can consist of the laser device itself used to generate the line of light 6, and in particular it can be made up of:
 a mobile or rotatable laser device;
 a fixed laser device coupled with a mobile reflecting element of the type of a mirror or the like.

Finally, the method M comprises a balancing verification stage, done by means of a further measurement of the unbalance of the wheel 3 (stage L).

In the case of the use of the method M for machines other than a balancing machine, the characteristic dimensions of the wheel 3 detected by means of the stages A and F can be used in another way.

In the case of a tyre-changing machine, e.g., they can be used to conveniently guide the tools in the stage of tyre fitting/removal to/from the rim.

It has been ascertained how the described invention achieves the proposed objects.

In this respect, the fact is underlined that the distribution of the acquisition stage during different rotation stages, performed in correspondence to different angular positions as previously described, allows making the acquisition of the structural and dimensional characteristics of the rim at higher wheel speeds, e.g., also during the unbalance measurement stage (generally done at high speed).

The camera fitted on the machine, in fact, even though it has a rather limited sampling speed with respect to the speed of the wheel, at every revolution is not forced to detect images for each angular position of the wheel but only for a limited number of these, the acquisition in the other angular positions being done during the subsequent rotations.

This therefore permits the acquisition of the structural and dimensional characteristics of the wheel at greater speed with respect to the known art, because it can also be done during the stage of unbalance measurement performed at high speed.

The invention claimed is:

1. A method for detecting the shape or dimensions of a wheel on vehicle repair workshop machines, comprising the stages of:
 projecting a line of light onto the surface of at least a portion of a wheel mounted and rotating on a vehicle repair workshop machine, said line of light being generated by at least one light emitter;
 acquiring a two-dimensional image of said projected line of light, said acquisition stage being performed by at least one light sensor; and
 processing said acquired image to determine the profile of said portion of the wheel;
 said method including at least two stages of complete rotation of said wheel and a distributed detection stage, wherein said projection stage and acquisition stage are performed in correspondence to a group of first angular positions of said wheel during the first of said rotation stages, and in correspondence to a group of second angular positions of said wheel during the second of said rotation stages,
 wherein said group of first angular positions differs from said group of second angular positions inasmuch as at least one of said first angular positions is not present in said group of second angular positions or inasmuch as at least one of said second angular positions is not present in said group of first angular positions, and
 wherein said light sensor at every revolution of the wheel is not forced to detect images for each angular position of the wheel but only for a limited number of these positions, the acquisition in the other angular positions being done during the subsequent rotations.

2. The method according to claim 1, wherein said first angular positions and said second angular positions are all distinct the one from the other and pre-established.

3. The method according to claim 2, wherein said first angular positions and said second angular positions are pre-established according to the following indices:
 x=1, . . . , n/2, wherein x is a series of integer numbers;
 j=2x−1, wherein j is an odd number, and
 k=2x, wherein k is an even number,
 where n indicates the total number of the first and second angular positions.

4. The method according to claim 1, further comprising selecting said angular positions on a random basis.

5. The method according to claim 4, further comprising dividing said wheel into at least two sectors, and wherein said distributed detection stage continues until images have been acquired in each sector for a pre-established number of angular positions.

6. The method according to claim 1, further comprising processing the plurality of images acquired during said distributed detection stage to determine corresponding profiles of said portion of the wheel.

7. The method according to claim 6, further comprising storing said profiles and the corresponding angular positions of the wheel.

8. The method according to claim 6, further comprising calculating, starting with said determined profiles of the wheel, the characteristic dimensions of the wheel depending on the angular positions.

9. The method according to claim 6, further comprising calculating, starting with said determined profiles of the wheel, the position and diameter of the balancing planes of the wheel.

10. The method according to claim 9, further comprising selecting the balancing planes to be used among the calculated balancing planes.

11. The method according to claim 6, further comprising calculating, starting with said determined profiles of the wheel, the measurement of the eccentricity of the wheel.

12. The method according to claim 1, wherein said light emitter is composed of a laser device.

13. The method according to claim 1, wherein said projection stages comprise the generation of at least a blade of light, the lying plane of said generated blade of light being suitable for intercepting the profile of at least a portion of said wheel, so as to project said line of light onto the surface of said profile.

14. The method according to claim 1, wherein said projection stages comprise the generation of at least a straight light beam and the oscillation of said straight light beam between two extreme positions, so as to project said line of light onto the surface of said profile.

15. The method according to claim 1, wherein said light sensor comprises a camera with a matrix sensor.

16. The method according to claim 15, further comprising displaying said portion of the wheel by means of at least a display operatively associated with said light sensor.

17. The method according to claim 16, wherein said displaying stage comprises the graphic representation of the position for the application of at least a balancing weight to apply to the wheel.

18. The method according to claim 1, further comprising indicating, on the wheel, the position for the application of at least a balancing weight to apply by means of a straight light beam.

19. The method according to claim 1, wherein said processing stage comprises the determination of said profile starting from said acquired image and from the relative predefined position between said light emitter and said light sensor.

* * * * *